US011021037B2

(12) United States Patent
Hwang et al.

(10) Patent No.: US 11,021,037 B2
(45) Date of Patent: Jun. 1, 2021

(54) THERMAL MANAGEMENT SYSTEM (71) Applicant: HANON SYSTEMS, Daejeon (KR)

(72) Inventors: In Guk Hwang, Daejeon (KR); Sung Je Lee, Daejeon (KR); Hae Jun Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 135 days.

(21) Appl. No.: 16/164,878

(22) Filed: Oct. 19, 2018

(65) Prior Publication Data
US 2019/0135071 A1    May 9, 2019

(30) Foreign Application Priority Data

Nov. 7, 2017   (KR) .................. 10-2017-0147012
Dec. 15, 2017  (KR) .................. 10-2017-0172837

(51) Int. Cl.
*B60H 1/00*     (2006.01)
*B60H 1/14*     (2006.01)
(Continued)

(52) U.S. Cl.
CPC ..... *B60H 1/00392* (2013.01); *B60H 1/00278* (2013.01); *B60H 1/00328* (2013.01); *B60H 1/00428* (2013.01); *B60H 1/00571* (2013.01); *B60H 1/00885* (2013.01); *B60H 1/00921* (2013.01); *B60H 1/143* (2013.01); *B60H 1/2215* (2013.01); *B60H 1/323* (2013.01); *B60H 2001/00307* (2013.01); *B60H 2001/00614* (2013.01); *B60H 2001/00928* (2013.01); *B60H 2001/00935* (2013.01); *B60H 2001/00949* (2013.01)

(58) Field of Classification Search
CPC ............... B60H 1/00392; B60H 1/004; B60H 1/00278; B60H 1/00328; B60H 1/00342; B60H 1/00571; B60H 1/00885; B60H 1/143; B60H 1/2215; B60H 1/323; B60H 2001/00928; B60H 2001/00935; B60H 2001/00949
See application file for complete search history.

(56) References Cited

U.S. PATENT DOCUMENTS 9,731,577 B2    8/2017  Johnston
9,944,152 B2 *  4/2018  Kim ................... B60H 1/00278
(Continued)

FOREIGN PATENT DOCUMENTS

DE    102011016070 A1    10/2012
FR    2992260 A1         12/2013
(Continued)

*Primary Examiner* — Jianying C Atkisson
*Assistant Examiner* — Miguel A Diaz
(74) *Attorney, Agent, or Firm* — Dickinson Wright PLLC (57) ABSTRACT The present invention relates to a thermal management system including: a refrigerant circulation line including a refrigerant circulator, a first heat exchanger, a first expander and a third heat exchanger, wherein refrigerant circulates in the refrigerant circulation line; a heating line for heating the interior by circulating cooling water exchanging heat with the refrigerant through the first heat exchanger; and a cooling line for cooling heating sources by exchanging heat between the cooling water and air or exchanging heat between the cooling water and the refrigerant.

12 Claims, 6 Drawing Sheets (51) Int. Cl.
   *B60H 1/32*   (2006.01)
   *B60H 1/22*   (2006.01)

(56) References Cited

U.S. PATENT DOCUMENTS

| | | | | |
|---|---|---|---|---|
| 10,589,596 | B2 * | 3/2020 | Riederer | B60H 1/00385 |
| 2005/0067158 | A1 * | 3/2005 | Ito | B60H 1/00885 |
| | | | | 165/204 |
| 2005/0167169 | A1 * | 8/2005 | Gering | B60L 58/26 |
| | | | | 237/12.3 B |
| 2006/0080985 | A1 * | 4/2006 | Inaba | B60H 1/00907 |
| | | | | 62/238.6 |
| 2007/0157647 | A1 * | 7/2007 | Duhme | B60L 15/20 |
| | | | | 62/196.4 |
| 2007/0193290 | A1 * | 8/2007 | Ebara | F25B 1/10 |
| | | | | 62/238.6 |
| 2008/0028768 | A1 * | 2/2008 | Goenka | F25B 21/04 |
| | | | | 62/3.2 |
| 2008/0085672 | A1 * | 4/2008 | Creed | F25B 27/00 |
| | | | | 454/69 |
| 2012/0183815 | A1 * | 7/2012 | Johnston | B60L 3/003 |
| | | | | 429/50 |
| 2013/0118707 | A1 * | 5/2013 | Kardos | H01M 10/625 |
| | | | | 165/42 |
| 2015/0034272 | A1 | 2/2015 | Saab et al. | |
| 2015/0075204 | A1 * | 3/2015 | Brodie | B60H 1/00335 |
| | | | | 62/324.6 |
| 2015/0101789 | A1 * | 4/2015 | Enomoto | B60L 1/003 |
| | | | | 165/202 |
| 2015/0251518 | A1 * | 9/2015 | Nemesh | B60H 1/00764 |
| | | | | 165/202 |
| 2016/0297280 | A1 * | 10/2016 | Riederer | F25B 21/02 |
| 2017/0106725 | A1 * | 4/2017 | Kim | B60H 1/00278 |
| 2017/0197488 | A1 * | 7/2017 | Kim | B60H 1/00278 |
| 2017/0326945 | A1 * | 11/2017 | Hatakeyama | B60H 1/00807 |
| 2018/0178615 | A1 * | 6/2018 | Xia | B60H 1/00392 |
| 2018/0215234 | A1 * | 8/2018 | Lott | F02B 37/16 |
| 2018/0222286 | A1 * | 8/2018 | Blatchley | B60H 1/00885 |
| 2018/0272840 | A1 * | 9/2018 | Onishi | B60H 1/025 |
| 2019/0047360 | A1 * | 2/2019 | Kishita | B60H 1/3216 |
| 2019/0118610 | A1 * | 4/2019 | Johnston | F25B 25/005 |
| 2019/0135071 | A1 * | 5/2019 | Hwang | B60H 1/00328 |
| 2019/0291540 | A1 * | 9/2019 | Gutowski | B60H 1/32284 |
| 2019/0344636 | A1 * | 11/2019 | Lee | B60H 1/32284 |
| 2019/0366800 | A1 * | 12/2019 | Durrani | B60H 1/00021 |
| 2020/0047591 | A1 * | 2/2020 | He | B60H 1/3227 |
| 2020/0361275 | A1 * | 11/2020 | Hwang | B60H 1/00278 |

FOREIGN PATENT DOCUMENTS

| | | | | |
|---|---|---|---|---|
| JP | 2019055704 A | * | 4/2019 | B60H 1/32 |
| KR | 101703604 B1 | | 2/2017 | |

* cited by examiner

THERMAL MANAGEMENT SYSTEM

CROSS-REFERENCE TO RELATED APPLICATIONS

This application claims the benefit and priority of KR 10-2017-0147012 filed Nov. 7, 2017 and KR 10-2017-0172837 filed Dec. 15, 2017. The entire disclosures of each of the above applications are incorporated herein by reference.

BACKGROUND OF THE INVENTION

Field of the Invention

The present invention relates to a thermal management system, and more particularly, to a thermal management system capable of managing heat of electronic parts and a battery in a vehicle as well as providing cooling and heating performance.

Background Art

Recently, electric vehicles are drawing attention as an eco-friendly technology and as a solution to solve a problem of exhaustion of energy in the automotive field. Electric vehicles are small in carbon emission and are quiet because moving by a motor driven by electric power received from a battery or a fuel cell. Moreover, the electric vehicles are eco-friendly since using the motor which is more improved in energy efficiency than the existing engines.

However, such electric vehicles are important in thermal management since using batteries and motors which are severe in heat generation, and are also important in efficient management of used time of the batteries since it takes so long time to recharge the batteries. Especially, such electric vehicles are also important in management of used time of the batteries since a compressor operated for air-conditioning of the interior of the vehicle is also operated by electric power.

SUMMARY OF THE INVENTION

Accordingly, the present invention has been made to solve the above-mentioned problems occurring in the prior arts, and it is an object of the present invention to provide a thermal management system capable of managing heat of electronic parts and a battery in a vehicle as well as providing cooling and heating performance.

It is another object of the present invention to provide a thermal management system capable of increasing used time of a battery by reducing an amount of electricity consumption.

It is a further object of the present invention to provide a thermal management system having refrigerant and cooling water lines with simple structures.

To accomplish the above object, according to the present invention, there is provided a thermal management system including: a refrigerant circulation line including a refrigerant circulator, a first heat exchanger, a first expander, and a third heat exchanger, wherein refrigerant circulates in the refrigerant circulation line; a heating line for heating the interior by circulating cooling water exchanging heat with the refrigerant through the first heat exchanger; and a cooling line for cooling heating sources by exchanging heat between the cooling water and air or exchanging heat between the cooling water and the refrigerant.

Moreover, the heating line and the cooling line are connected with each other and blocked from each other according to an interior cooling mode and an interior heating mode. The heating line and the cooling line are connected with each other in the interior cooling mode. The heating line and the cooling line are blocked from each other in the interior heating mode. The heating line and the cooling line are connected into a serial line. The cooling line includes: a first connection line branching off from one side of the cooling line and being connected with the heating line; and a second connection line branching off from the other side of the cooling line and being connected with the heating line. The first connection line, the second connection line, and the heating line are connected with one another or blocked from one another by one cooling water direction changer. When the heating line and the cooling line are connected with each other, electronic parts are arranged in the first connection line and the second connection line in which cooling water flows from the heating line to the cooling line. When the heating line and the cooling line are blocked from each other, the electronic parts are connected to the cooling line by the first connection line and the second connection line to be cooled by the cooling water. The refrigerant circulation line includes: a first expander for throttling the refrigerant discharged from the first heat exchanger or making the refrigerant bypass; and a second heat exchanger for exchanging heat between the refrigerant discharged from the first expander and air to discharge the refrigerant to the second expander. The refrigerant circulation line includes: a third expander for throttling the refrigerant discharged from the first heat exchanger, making the refrigerant bypass or blocking a flow of the refrigerant; and a fourth heat exchanger for exchanging heat between the refrigerant discharged from the third expander and the cooling water of the cooling line. The heating sources are cooled by the cooling water heat-exchanged with the fourth heat exchanger. The cooling line includes: a sixth heat exchanger for cooling the cooling water by air; and a heating source cooled by the cooling water cooled by the sixth heat exchanger or the cooling water cooled by the fourth heat exchanger. The fourth heat exchanger and the heating source are connected in series or in parallel by the cooling line. The heating line includes: a fifth heat exchanger for heating the interior by exchanging heat between the cooling water, which exchanges heat with the refrigerant through the first heat exchanger, and the air introduced into the interior; and an electric heater arranged at the front end of the fifth heat exchanger to heat the cooling water.

According to the present invention, the thermal management system can increase used time of the battery by reducing an amount of electricity consumption, and reduce maintenance costs and manufacturing costs due to simple structures of the refrigerant line and the cooling water line.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

In order to fully understand the present invention, exemplary embodiments of the invention will be described with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components. A detailed explanation of known related functions and constitutions may be omitted to avoid unnecessarily obscuring the subject matter of the present invention.

Figure 1:
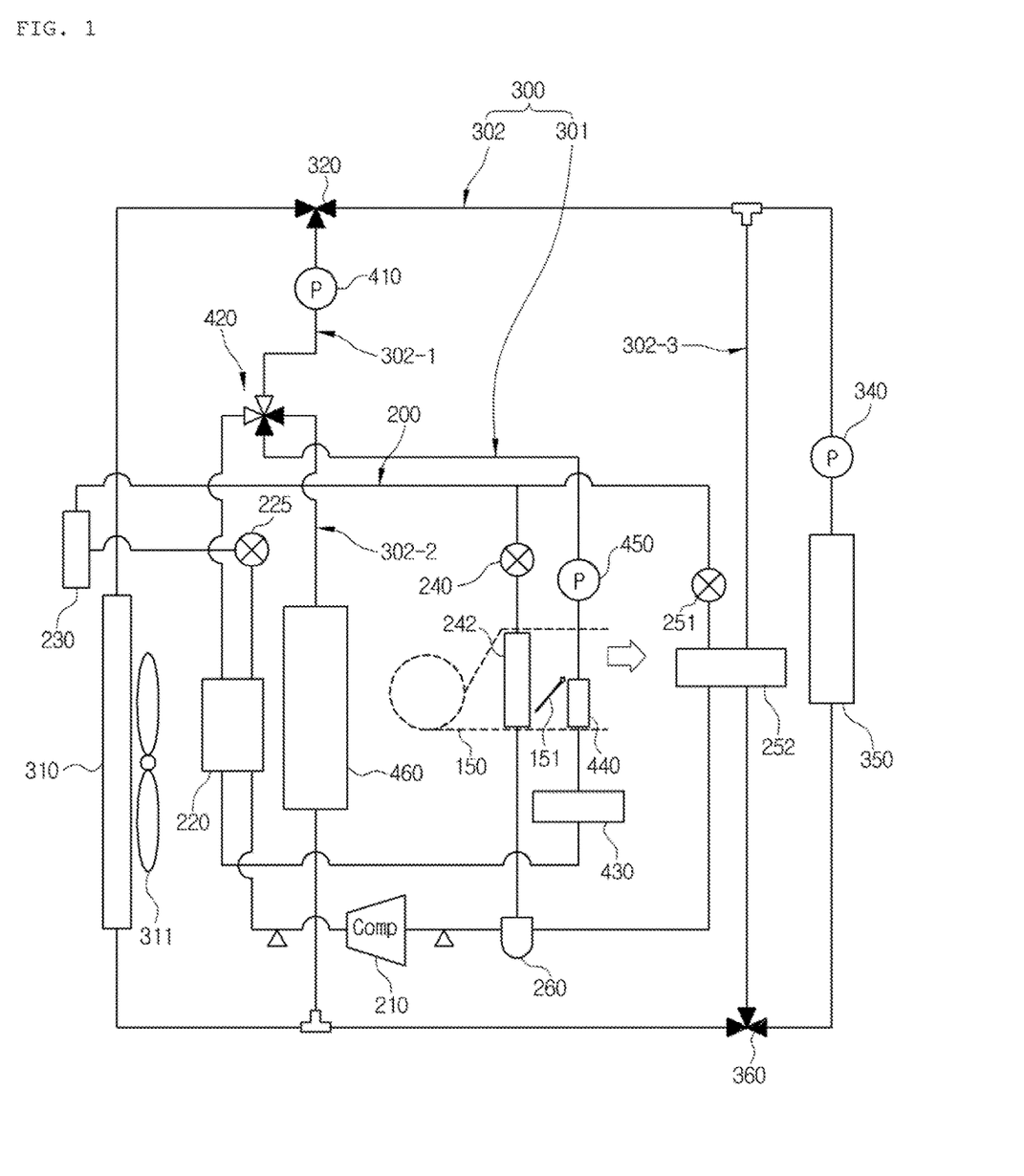
FIG. 1 is a configurative diagram of a thermal management system according to a preferred embodiment of the present invention.

FIG. 1 is a configurative diagram of a thermal management system according to a preferred embodiment of the present invention.

As shown in FIG. 1, the thermal management system includes a refrigerant circulation line 200 in which refrigerant circulates and a cooling water circulation line 300 in which cooling water circulates.

The refrigerant includes a refrigerant circulator 210, first to fourth heat exchangers 220, 230, 242 and 252, first to third expanders 225, 240 and 251, and an accumulator 260. The components will be described in detail as follows.

The refrigerant circulator 210 serves as a heart for circulating refrigerant in the refrigerant circulation line 200. As an example, the refrigerant circulator 210 may be an electronic compressor. Hereinafter, the refrigerant circulator and the electronic compressor will be described with the reference numeral 210. The electronic compressor which is the refrigerant circulator 210 receives electric power and compresses and discharges the refrigerant, and is divided into a scroll type, a swash type, a rotary type, and a wobble type according to a compression form. In this embodiment, the electronic compressor may adopt all types regardless of the compression form of the compressor.

The first to fourth heat exchangers 220, 230, 242 and 252 serve to exchange heat with other medium, for instance, cooling water or air. Moreover, the first to third expanders 225, 240 and 251 serve to throttle or bypass refrigerant or block a flow of the refrigerant.

The first heat exchanger 220 serves as a condenser in the refrigerant circulation line 200. That is, the first heat exchanger 220 receives refrigerant of high temperature and high pressure discharged from the refrigerant circulator 210, and then, exchanges heat with cooling water to lower temperature of the refrigerant.

The first expander 225 is arranged between the first heat exchanger 220 and the second heat exchanger 230 to throttle or bypass the refrigerant. For this, the first expander 225 may adopt the form that an orifice and a bypass connected with a front/rear end of the orifice are combined with each other, a thermal expansion valve (TXV), or an electronic expansion valve (EXV). The second expander 240 varies its function according to that the refrigerant circulation line 200 is used as an air conditioner loop or a heat pump loop. The second expander 240 bypasses the refrigerant if the refrigerant circulation line 200 is used as the air conditioner loop, and throttles and passes the refrigerant if the refrigerant circulation line 200 is used as a heat pump loop.

The second heat exchanger 230 in connection with the first expander 225 serves as a condenser or an evaporator in the refrigerant circulation line 200. For this, the second heat exchanger 230 may be designed to have a structure to exchange heat between air and refrigerant. The second heat exchanger 230 may vary its function according to the role of the first expander 225. That is, the second heat exchanger 230 serves as a condenser together with the first heat exchanger 220 if the first expander 225 bypasses the refrigerant (air conditioner loop), and serves as an evaporator if the first expander 225 throttles the refrigerant (heat pump loop).

The second expander 240 is arranged between the second and third heat exchangers 230 and 242 to throttle or bypass the refrigerant. For this, the second expander 240 may adopt the form that an orifice and a bypass connected with a front/rear end of the orifice are combined with each other, a thermal expansion valve (TXV), or an electronic expansion valve (EXV). The second expander 240 varies its function according to that the refrigerant circulation line 200 is used as the air conditioner loop or the heat pump loop. The second expander 240 throttles and passes the refrigerant if the refrigerant circulation line 200 is used as the air conditioner loop, and bypasses or blocks the refrigerant if the refrigerant circulation line 200 is used as the heat pump loop.

The third heat exchanger 242 is disposed in the air conditioner 150, for instance, may be an air conditioner for a vehicle (HVAC) and serves as an evaporator. For this, the third heat exchanger 242 is designed to have a structure to exchange heat between the air supplied to the interior and the refrigerant. Moreover, the third heat exchanger 242 serves as an evaporator if the refrigerant circulation line 200 is an air conditioner loop, and serves as an evaporator or a refrigerant flow path (bypass, in this instance, the third heat exchanger 242 also serves as the evaporator when serving as the bypass) if the refrigerant circulation line 200 is a heat pump loop. Here, the case that the refrigerant circulation line 200 is the heat pump loop means that indoor heating is required since outdoor temperature is low. In this instance, the evaporator serves as a dehumidifier. Therefore, the third heat exchanger 242 serves as an evaporator for dehumidification and serves as the refrigerant flow path if the refrigerant circulation line 200 is the heat pump loop. Furthermore, the air conditioner 150 includes a temperature adjusting door 151.

The third expander 251 is arranged between the second heat exchanger 230 and the fourth heat exchanger 252 to throttle or bypass the refrigerant. For this, the third expander 251 may adopt the form that an orifice and a bypass connected with a front/rear end of the orifice are combined with each other, a thermal expansion valve (TXV), or an electronic expansion valve (EXV). The third expander 251 throttles and passes the refrigerant when cooling of cooling water is required, but bypasses the refrigerant or blocks circulation of the refrigerant if there is no need to cool the cooling water.

The fourth heat exchanger 252 linked with the third expander 251 serves as a chiller in the refrigerant circulation line 200. For this, the fourth heat exchanger 252 may be designed to have a structure to exchange heat between air and refrigerant.

The accumulator 260 is arranged between the third and fourth heat exchangers 242 and 252 and the refrigerant circulator 210 to separate liquid-phase refrigerant from gas-phase refrigerant and transfer only the gas-phase refrigerant to the refrigerant circulator 210.

The cooling water circulation line 300 includes a heating line 301 for indoor heating and a battery 350, or a cooling line 302 for cooling electronic parts 460.

In this instance, the heating line 301 includes an electric heater 430, a fifth heat exchanger 440, a cooling water circulator 450, and a first direction changer 420.

The electric heater 430 is a device for heating cooling water, and is connected with a discharge terminal of the first heat exchanger 220. The electric heater 430 may be an induction heater, a sheath, a PTC heater, or a thin film (TF) heater, which is actuated when temperature of cooling water heated by the first heat exchanger 220 or the battery 350 and the electronic parts 460 is less than a predetermined value.

The fifth heat exchanger 440 is disposed inside the air conditioner 150 and serves as a heater core. That is, the fifth heat exchanger 440 exchanges heat between the cooling water and the air supplied to the interior to heat the interior.

The cooling water circulator 450 is a device for circulating cooling water, and may have a pump shape. A cooling water circulation direction of the cooling water circulator 450 is decided according to a connection direction of the electric heater 430 and the fifth heat exchanger 440. The cooling water circulator 450 is actuated in such a way that cooling water faces the fifth heat exchanger 440 after passing the electric heater 430. Therefore, as shown in the drawing, cooling water moves in the opposite direction of the fifth heat exchanger 440 when the cooling water circulator 450 is at a rear end of the fifth heat exchanger 440, and moves in the direction of the electric heater 430 when the cooling water circulator 450 is at the front end of the electric heater 430.

The first direction changer 420 serves to selectively connect or block the heating line 301 and the cooling line 302. For this, the first direction changer 420 may be a four-way valve. The selective connection of the first direction changer 420 comes from the operation mode of the thermal management system, and it will be described later in detail.

The cooling line 302 includes a battery 350, a sixth heat exchanger 310, a second cooling water circulator 340, and second and third direction changers 320 and 360. Additionally, the cooling line 302 includes first to third connection lines 302-1, 302-2 and 302-3, and a third cooling water circulator 340.

The battery 350 is a power source of the vehicle and is a driving source of various electronic parts in the vehicle. According to circumstances, the battery 350 is connected with a fuel cell to store electric power or to store electric power supplied from the outside.

The sixth heat exchanger 310 serves as a radiator to cool cooling water. That is, the sixth heat exchanger 310 exchanges heat between the cooling water and air to cool the cooling water heated by the battery 350 and the electronic parts 460. For this, the sixth heat exchanger 310 may have a fan 311 to increase an air supply amount. In the meantime, the second heat exchanger 230 for exchanging heat between the refrigerant and air may also have the fan 311 to increase efficiency, and in this instance, in order to minimize occupation of a space, the second and sixth heat exchangers 230 and 310 are put on another, and then, the fan 311 is arranged.

The second cooling water circulator 340 serves to circulate the cooling water of the cooling line 302, and may have a pump shape.

The second direction changer 320 connects the cooling line 302 and the heating line 301 with each other. The thermal management system connects or blocks the cooling line 302 and the heating line 301 according to the operation mode, and in this instance, the first control is carried out by the second direction changer 320, so the cooling line 302 and the heating line 301 are connected or blocked through the first connection line 302-1. Moreover, since the second direction changer 320 is difficult to control a flow speed of the cooling water, the third cooling water circulator 410 is arranged in the first connection line 302-1. In this instance, the second direction changer 320 is a three-way valve.

Furthermore, in a state that a passage to move the cooling water of the cooling line 302 to the heating line 301 (the first connection line 302-1) is secured, the cooling water of the heating line 301 must be moved to the cooling line 302 again. For this, the second connection line 302-2 is disposed. In this instance, the electronic parts 460 are arranged in the second connection line 302-2 so that the electronic parts 460 are cooled by the cooling water.

Finally, the third connection line 302-3 is disposed to be connected with the fourth heat exchanger 252 to cool the cooling water, and the connected state is determined by the third direction changer 360. According to circumstances, the third connection line 302-3 may be omitted, and in this instance, the fourth heat exchanger 252 directly exchanges heat with the cooling water of the cooling line 302 adjacent to the battery 350.

As described above, the cooling water circulation line 300 according to this embodiment of the present invention connects or blocks the heating line 301 for heating the interior and the cooling line 302 for cooling the battery 350 and the electronic parts 460 according to the operation mode of the thermal management system. The connection and the blocking between the heating line 301 and the cooling line 302 are made possible by the first and second direction changers 420 and 320. Especially, because the first direction changer 420 is a four-way valve for connecting and blocking the heating line 301 and the first and second connection lines 302-1 and 302-2, the heating line 301 and the cooling line 302 can be easily connected and blocked through the simple structure. Additionally, the number of the direction changers for changing a flow of the cooling water may be reduced.

Hereinafter, operations of the thermal management system according to operation modes will be described.

1. Indoor Cooling—when Cooling Load is Small (for Instance, in Spring and Fall)

Figure 2:
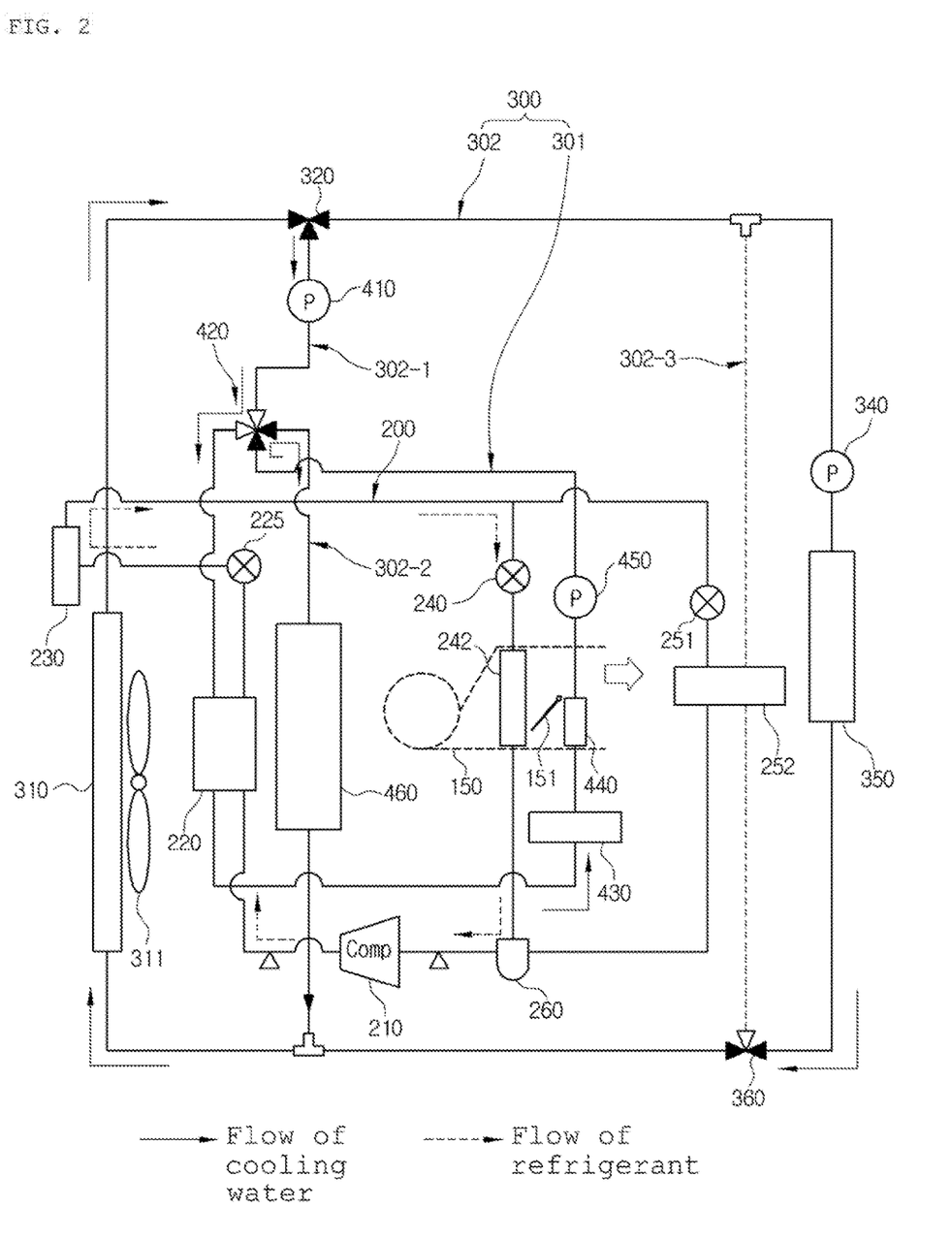
FIGS. 2 and 3 are views showing an interior cooling mode of the thermal management system according to the preferred embodiment of the present invention.

FIG. 2 is a view showing an interior cooling mode of the thermal management system.

In the interior cooling mode, the refrigerant circulator 210 is actuated. Since cooling load is small, the refrigerant circulator 210 is actuated at low RPM. It means that power consumption is reduced. Continuously, refrigerant of high temperature and high pressure is discharged according to operation of the refrigerant circulator 210, and the refrigerant exchanges heat with the cooling water in the first heat exchanger 220 to be cooled. Next, the first expander 225 makes the refrigerant bypass to be transferred to the second heat exchanger 230, and the second heat exchanger 230 exchanges heat between the refrigerant and air to be cooled more. That is, the first and second heat exchangers 220 and 230 serve as a condenser to condense the refrigerant.

Continuously, the second expander 240 throttles the refrigerant, and the third heat exchanger 242 evaporates the refrigerant to cool the interior. Moreover, the third expander 251 blocks a flow of the refrigerant to prevent the refrigerant from flowing to the fourth heat exchanger 252. After that, the refrigerant passes through the accumulator 260, and then, is transferred to the refrigerant circulator 210 to repeat the above circulation.

Meanwhile, the cooling water is circulated by the cooling water circulators 340, 410 and 450 to be heated by absorbing heat of the battery 350, the electronic parts 460 and the first heat exchanger 220. On the contrary, the battery 350, the electronic parts 460, and the refrigerant of the first heat exchanger 220 are cooled by the cooling water. In this instance, the first direction changer 420 circulates the cooling water in the direction to connect the heating line 301 and the cooling line 302, so that heating sources, such as the battery 350, the electronic parts 460 and the first heat exchanger 220, are connected by the cooling water. That is, the first direction changer 420 simplifies the cooling water line to induce the flow of the cooling water in the direction to increase cooling efficiency of the heating sources 350, 460 and 220.

The heated cooling water is cooled by exchanging heat with the air in the sixth heat exchanger 310, and then, is transferred to the battery 350, the electronic parts 460 and the first heat exchanger 220 to cool the battery 350 and the electronic parts 460. After that, the above process is repeated.

Summing up, interior cooling is achieved through the air conditioner loop formed by the refrigerant circulator 210, the first heat exchanger 220 serving as a condenser, the second heat exchanger 230, the second expander 240, and the third heat exchanger 242 serving as an evaporator in order. In this instance, condensation of the refrigerant is carried out twice (water cooling and air cooling) to enhance efficiency. Furthermore, the heating sources, namely, the battery 350 and the electronic parts 460, are cooled by air cooling through the radiator 310. As described above, the heating sources 350 and 460, especially, the battery 350, are cooled by air cooling due to small cooling load. In this instance, because the fourth heat exchanger 252 doesn't have to be operated, refrigerant load gets less, so RPM of the refrigerant circulator 210 may be lowered. That is, as described above, power consumption is reduced.

2. Indoor Cooling—when Cooling Load is Large (for Instance, in Summer)

Figure 3:
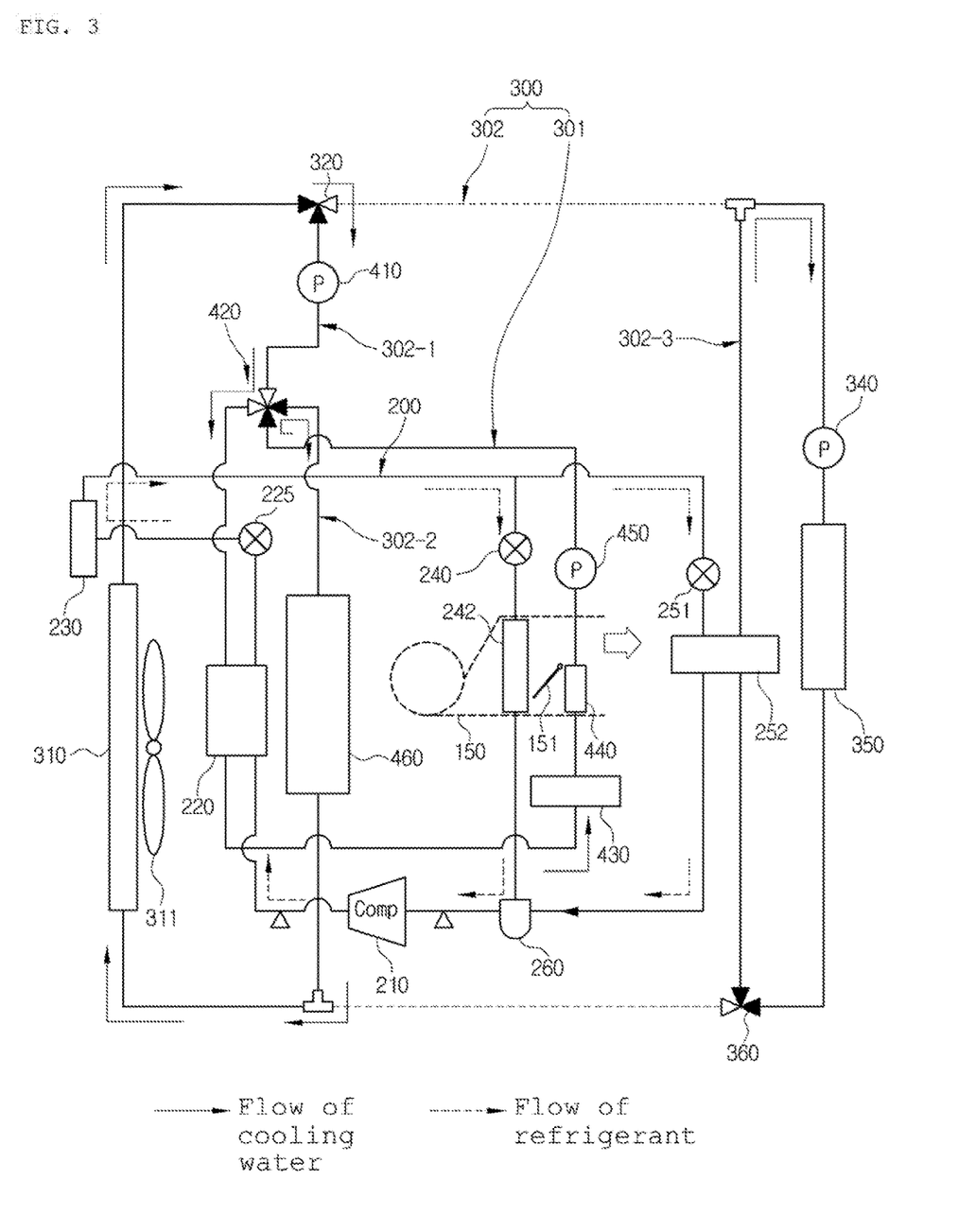

FIG. 3 is a view showing an interior cooling mode of the thermal management system like FIG. 1. In this instance, description of duplicate contents compared with the description of FIG. 2 will be omitted.

In the interior cooling mode, the refrigerant circulator 210 is actuated. Since cooling load is large, the refrigerant circulator 210 is actuated at high RPM. Continuously, refrigerant of high temperature and high pressure is discharged according to operation of the refrigerant circulator 210, and the refrigerant exchanges heat with the cooling water in the first heat exchanger 220 to be cooled. Next, the first expander 225 makes the refrigerant bypass to be transferred to the second heat exchanger 230, and the second heat exchanger 230 exchanges heat between the refrigerant and air to be cooled more. That is, the first and second heat exchangers 220 and 230 serve as a condenser to condense the refrigerant.

Continuously, the second expander 240 throttles the refrigerant, and the third heat exchanger 242 evaporates the refrigerant to cool the interior. Moreover, the third expander 251 blocks a flow of the refrigerant to prevent the refrigerant throttles the refrigerant, and the fourth heat exchanger 252 exchanges heat between the refrigerant and the cooling water. That is, the fourth heat exchanger 252 cools the cooling water by the refrigerant. After that, the refrigerant passes through the accumulator 260, and then, is transferred to the refrigerant circulator 210 to repeat the above circulation.

Meanwhile, the cooling water is circulated by the second cooling water circulator 340 the third cooling water circulator 410 and the cooling water circulator 450 to be heated by absorbing heat of the battery 350, the electronic parts 460 and the first heat exchanger 220. On the contrary, the battery 350, the electronic parts 460, and the refrigerant of the first heat exchanger 220 are cooled by the cooling water. In this instance, the cooling line 302 is divided into a first cooling line for cooling the refrigerant of the electronic parts 460 and the first heat exchanger 220 and a second cooling water line for cooling the battery 350 by the second and third direction changers 320 and 360. It is effective to use refrigerant to cool cooling water, but if all heating sources 350, 460 and 220 are cooled by refrigerant, load is applied to the refrigerant, and it has a bad influence on interior cooling. In order to prevent it, only the battery 350 is cooled by the refrigerant, and the rest heating sources 460 and 220 are cooled by the radiator, which is the sixth heat exchanger 310.

Summing up, interior cooling is achieved through the air conditioner loop formed by the refrigerant circulator 210, the first heat exchanger 220 serving as a condenser, the second heat exchanger 230, the second expander 240, and the third heat exchanger 242 serving as an evaporator in order. Moreover, cooling of the electronic parts 460 among the heating sources is achieved by air cooling through the radiator 310, and cooling of the battery 350 is achieved by the refrigerant through the chiller 252.

3. Interior Heating

Figure 4:
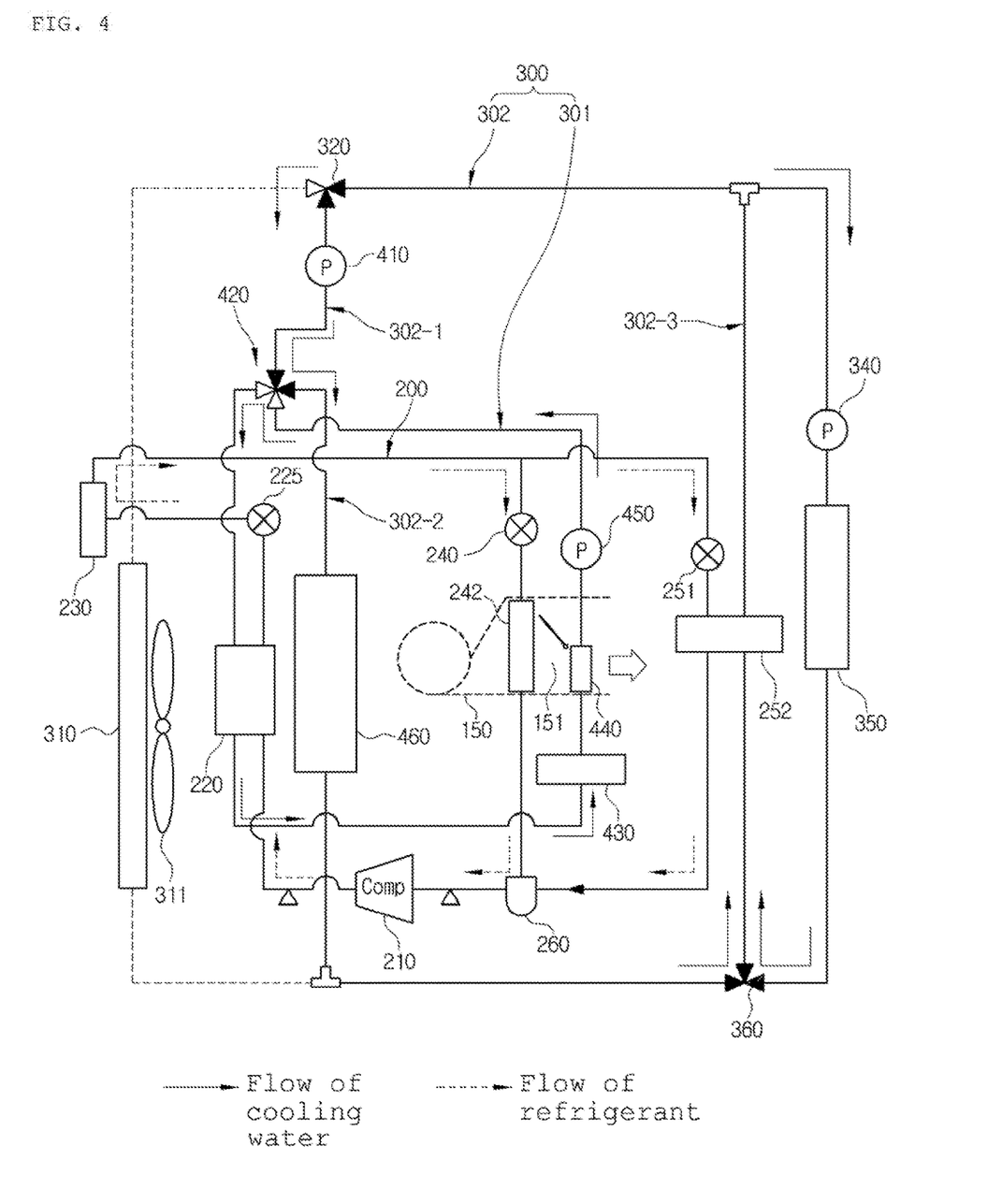
FIGS. 4 to 6 are views showing an interior heating mode of the thermal management system according to the preferred embodiment of the present invention.
Figure 5:
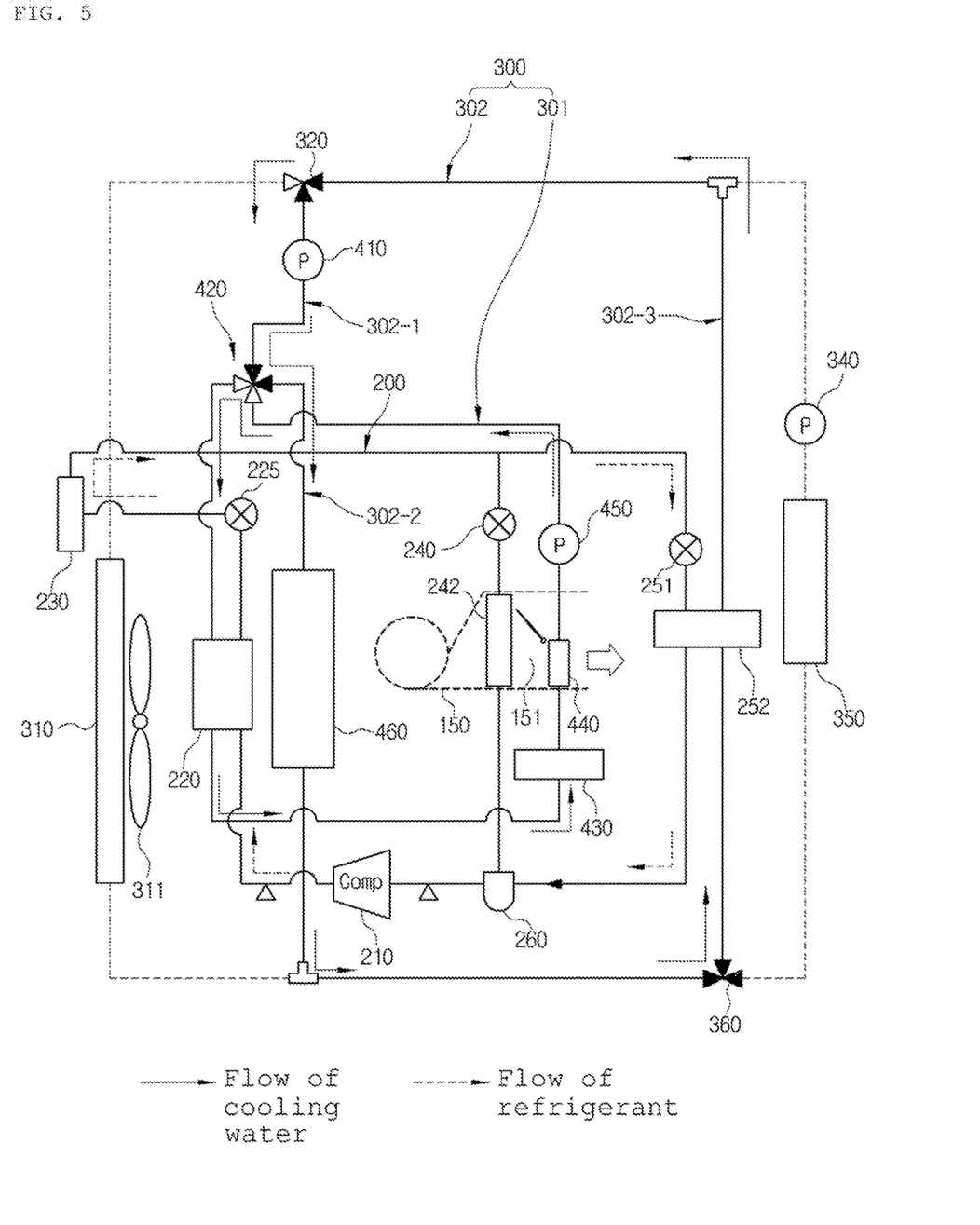
Figure 6:
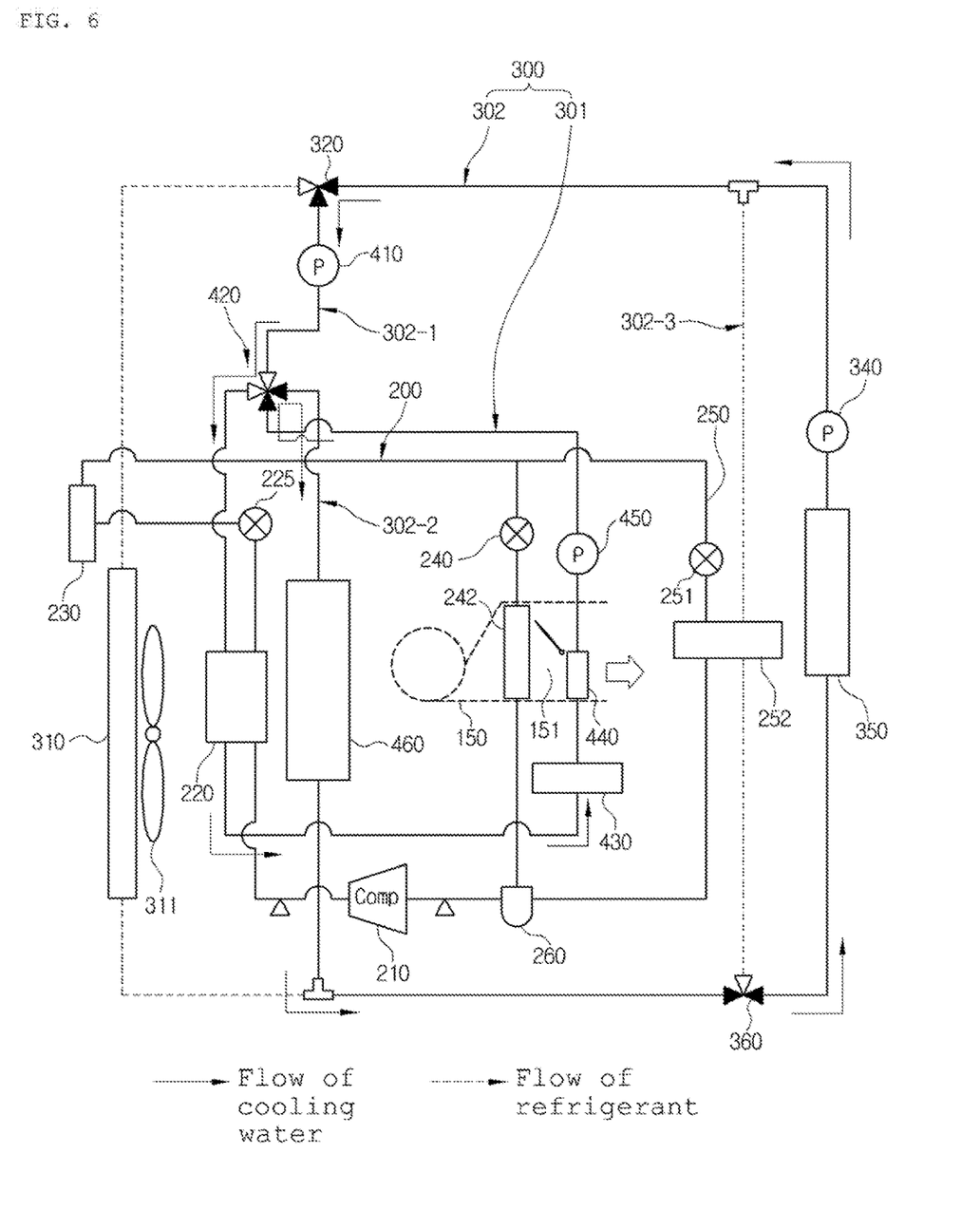

FIGS. 4 to 6 are views showing an interior heating mode of the thermal management system according to the preferred embodiment of the present invention. In this instance, description of duplicate contents compared with the description of FIG. 2 and will be omitted.

First, referring to FIG. 4, the refrigerant circulator 210 is actuated at intermediate RPM because of interior heating. Continuously, when the refrigerant circulator 210 is actuated, refrigerant of high temperature and high pressure is discharged, and the refrigerant is cooled by exchanging heat with cooling water in the first heat exchanger 220. On the contrary, the cooling water is heated by the refrigerant of the first heat exchanger 220. Continuously, the first expander 225 throttles the refrigerant, and the second heat exchanger 230 evaporates the refrigerant. That is, the first heat exchanger 220 serves as a condenser, and the second heat exchanger 230 serves as an evaporator.

Continuously, the second expander 240 blocks the refrigerant flowing to the third heat exchanger 242 because interior heating does not require the third heat exchanger 242 used as the evaporator. Moreover, the third expander 251 makes the refrigerant bypass to transfer the refrigerant to the fourth heat exchanger 252. The refrigerant is heated by absorbing heat of the cooling water in the fourth heat exchanger 252. After that, the refrigerant passes through the accumulator 260, and then, is transferred to the refrigerant circulator 210 to repeat the above circulation.

In the meantime, the heating line 301 and the cooling line 302 form closed loops by the first and second direction changers 420 and 320. The heating line 301 transfers the cooling water heated by the first heat exchanger 220 to the fifth heat exchanger 440 to heat the interior. That is, the heating line 301 heats the interior using the cooling water receiving heat from the refrigerant of high temperature. If temperature of the heat received from the refrigerant is not sufficient, the cooling water may be heated using the electric heater 430. The cooling line 302 is the closed loop for connecting the battery 350 and the electronic parts 460, and uses the electronic parts 460 as a heating source for warming up the battery 350. In this instance, cooling water does not flow to the sixth heat exchanger 310, so the fan 311 is not actuated and power consumption is reduced. In this instance, because heating of the interior means that outdoor temperature is low and that it is not necessary to have means for cooling the battery 350, the sixth heat exchanger 310 and the fan 311 are not used. However, under circumstances requiring interior heating but having outdoor temperature which is not low like early winter or late spring, the sixth heat exchanger 310 and the fan 311 may be used to cool the cooling water of the cooling line 302.

In addition, as shown in FIG. 5, according to temperature of the battery 350, the third direction changer 360 and the second cooling water circulator 340 are controlled to block the flow of the cooling water of the battery 350 and the electronic parts 460 or to reduce the flow velocity of the cooling water. That is, because the second cooling water circulator 340 is not actuated, power consumption is reduced. Because temperature of the battery is not sufficiently high, under a condition that it is difficult to utilize waste heat of the battery, in an air-conditioning mode, the flow of the cooling water toward the battery 350 is blocked.

Summing up, interior heating uses the cooling water heated by the refrigerant of high temperature. Additionally, interior heating may be achieved by heating the cooling water by the electric heater 430. The refrigerant circulation line 200 has the structure to be operated by a heat pump, but interior heating is achieved not by the refrigerant but by the cooling water. Therefore, the second heat exchanger 230 and the first expander 225 in the refrigerant circulation line 200 may be deleted according to circumstances.

FIG. 6 is a view showing the interior heating mode in mild weather. As shown in FIG. 6, the refrigerant circulator 210 does not actuate. That is, in the interior heating mode, refrigerant does not flow in the refrigerant circulation line 200. Therefore, the refrigerant circulator 210 does not actuate, so power consumption may be reduced. All lines of the cooling water circulation line 300 except the cooling line 302 directing to the sixth heat exchanger 310 and the third connection line 302-3 are connected to circulate the cooling water.

Heating sources for interior heating are the battery 350 and the electronic parts 460. Because it is not necessary to raise the temperature of the interior in mild weather, heating is available just by the battery 350 and the electronic parts 460. For additional heating, the electric heater 430 may be actuated.

Moreover, the battery 350 is warmed up by the electronic parts 460. If temperature of the electronic parts 460 does not sufficiently raise temperature of the battery 350, the electric heater 430 is actuated to warm up the battery 350. Warming up of the battery may increase charging efficiency when the battery is charged.

Summing up, in the mild weather, the interior is heated just by the cooling water heated by waste heat of the battery 350 and the electronic parts 460 without any flow of the refrigerant. Because the refrigerant circulator 210 is not actuated, power consumption is low.

Furthermore, because the battery 350 is warmed up by the electronic parts 460 or the electric heater 430, it increases an early operation performance of the battery 350.

Finally, the thermal management system according to this embodiment has the structure to simplify the complicated refrigerant line for performing not only cooling but also heating (heat pump) and the complicated cooling water line by various heating sources, such as the electronic parts and the battery, and the cooling sources, such as the radiator, the fan, and the chiller. Moreover, the thermal management system is utilized for cooling and heating by properly exchanging heat between the refrigerant and the cooling water, and is also utilized for cooling the heating sources.

The thermal management system can reduce power consumption by properly blocking power supply to power consumption sources, such as a compressor and a cooling water pump, according to outdoor temperature in order to enhance the mileage of an electric vehicle. Furthermore, the thermal management system can reduce power consumption through the structure to recover waste heat of the heating sources.

The embodiments of the thermal management system as described above are only the example. Therefore, it will be appreciated by those skilled in the art that various modifications and equivalent other embodiments are possible from the present invention. Therefore, it may be appreciated that the present invention is not limited to the forms mentioned in the above detailed description. For instance, the accumulator 260 described in this embodiment may be substituted for a receiver drier arranged between the first heat exchanger 220, which is a condenser, and the first expander 225.

Additionally, in the refrigerant circulation line 200, the second heat exchanger 230 and the first expander 225 may be deleted in some cases. That is, if the refrigerant can be condensed sufficiently by the first heat exchanger 220, the refrigerant circulation line 200 may be simply formed by a compressor, a condenser, an expander, and an evaporator. Accordingly, the actual technical protection scope of the present invention must be determined by the spirit of the appended claims. Further, it is to be construed that the present invention includes all the changes, equivalents, and substitutions which are defined in the appending claims.

What is claimed is:

1. A thermal management system for a vehicle, comprising:
    a refrigerant circulation line containing a refrigerant;
    a compressor located along the refrigerant circulation line for compressing and circulating the refrigerant through the refrigerant circulation line;
    a first heat exchanger located along the refrigerant circulation line and configured to receive high temperature and high pressure refrigerant discharged from the compressor and exchange heat between the refrigerant and cooling water to lower a temperature of the refrigerant;
    a first expander located along the refrigerant circulation line and configured to throttle or bypass the refrigerant that has passed through the first heat exchanger;
    a second heat exchanger located along the refrigerant circulation line and serving as an evaporator or condenser by exchanging heat between air and the refrigerant that has passed through the first expander and the first heat exchanger;
    a third heat exchanger located along the refrigerant circulation line in an air conditioner and serving as an evaporator for cooling air entering an interior of the vehicle through the air conditioner;
    a second expander installed along the refrigerant circulation line between the second heat exchanger and the third heat exchanger to throttle or bypass the refrigerant;
    a fourth heat exchanger located along the refrigerant circulation line and serving as a chiller;

a third expander located along the refrigerant circulation line between the second heat exchanger and the fourth heat exchanger to throttle or bypass the refrigerant;

an accumulator located along the refrigerant circulation line and configured to deliver only gaseous refrigerant to the compressor;

a cooling water circulation line including a heating line and a cooling line for circulating water;

a fifth heat exchanger located along the heating line in the air conditioner and serving as a heater core for heating the air entering the interior of the vehicle by exchanging heat between the water and air supplied to the interior through the air conditioner;

a heat source located along the cooling line; and the fourth heat exchanger also located along the cooling line for exchanging heat between the refrigerant in the refrigerant circulation line and the water in the cooling line such that water cooled by the fourth heat exchanger can cool the heat source.

2. The thermal management system according to claim 1, wherein an electric heater is arranged at the front end of the fifth heat exchanger to heat the cooling water.

3. The thermal management system according to claim 1, wherein the cooling line comprises:

a sixth heat exchanger for cooling the cooling water by air; and a heating source cooled by the cooling water cooled by the sixth heat exchanger or the cooling water cooled by the fourth heat exchanger.

4. The thermal management system according to claim 3, wherein the fourth heat exchanger and the heating source are connected in series or in parallel by the cooling line.

5. The thermal management system according to claim 1, wherein the heating line and the cooling line are connected with each other or blocked from each other according to an interior cooling mode and an interior heating mode.

6. The thermal management system according to claim 5, wherein the heating line and the cooling line are blocked from each other in the interior heating mode.

7. The thermal management system according to claim 5, wherein the heating line and the cooling line are connected with each other in the interior cooling mode.

8. The thermal management system according to claim 7, wherein the heating line and the cooling line are connected into a serial line.

9. The thermal management system according to claim 8, wherein the cooling line comprises:

a first connection line branching off from a first side of the cooling line and being connected with the heating line; and a second connection line branching off from a second side of the cooling line and being connected with the heating line.

10. The thermal management system according to claim 9, wherein the first connection line, the second connection line, and the heating line are connected with one another or blocked from one another by one cooling water direction changer.

11. The thermal management system according to claim 9, wherein electronic parts are located along the first connection line and the second connection line in which cooling water flows from the heating line to the cooling line.

12. The thermal management system according to claim 11, wherein the electronic parts are connected to the cooling line by the first connection line and the second connection line to be cooled by the cooling water.

* * * * *